March 19, 1940.  J. PEYSER  2,193,981
SEAMING MACHINE
Filed Sept. 28, 1938  5 Sheets-Sheet 1
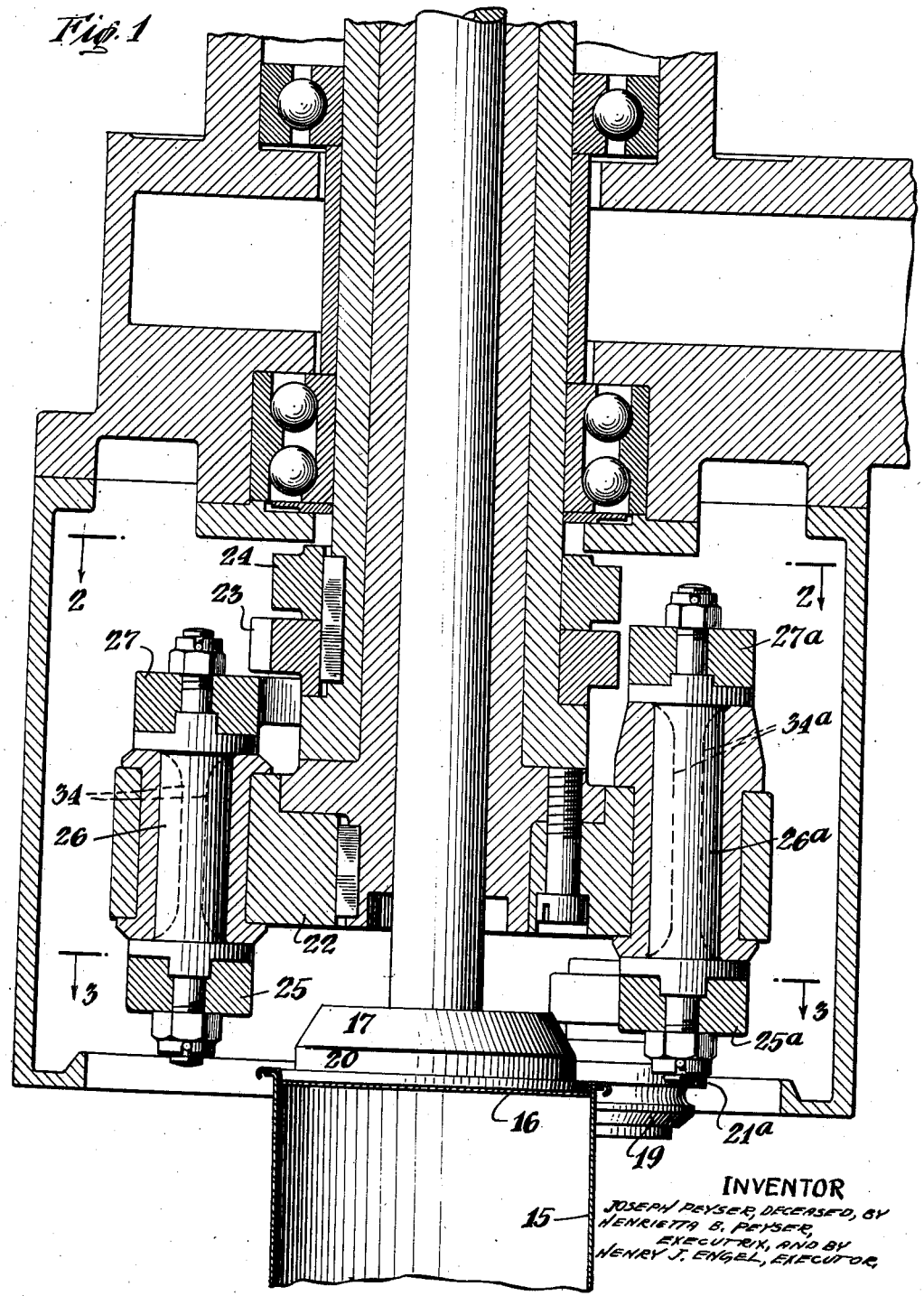
INVENTOR
JOSEPH PEYSER, DECEASED, BY
HENRIETTA B. PEYSER,
EXECUTRIX, AND BY
HENRY J. ENGEL, EXECUTOR
BY
ATTORNEY

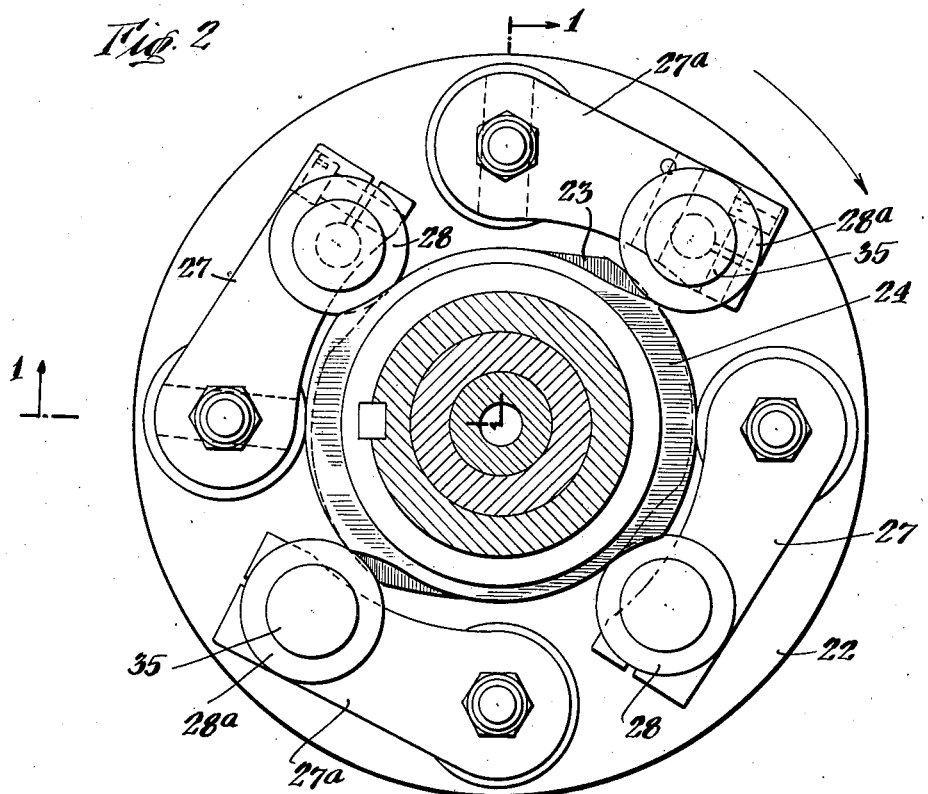
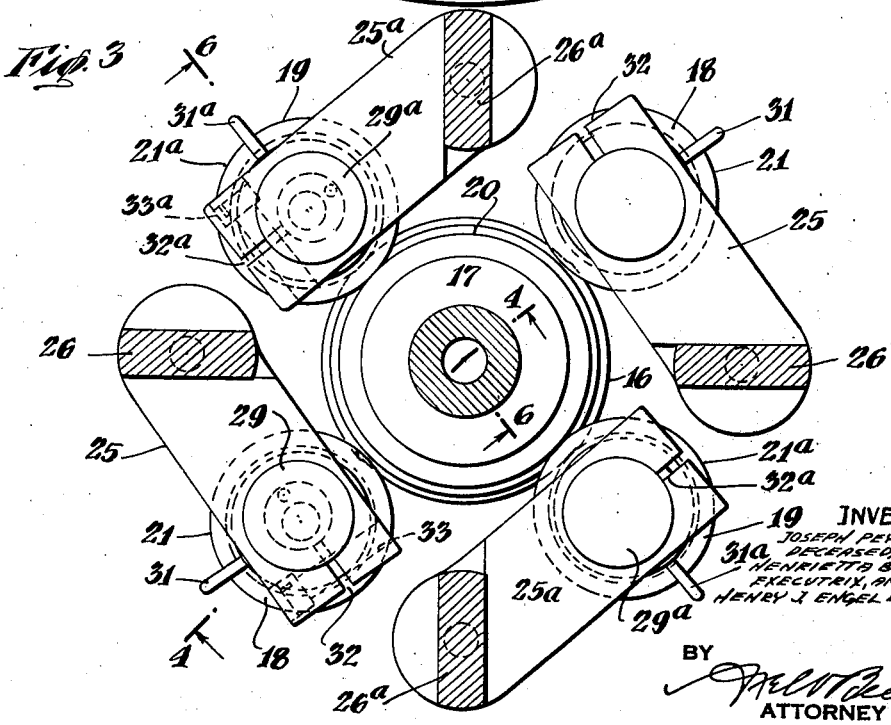

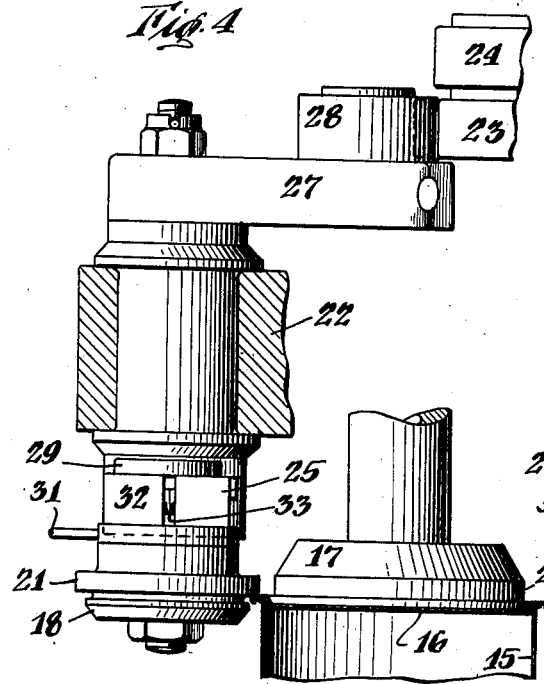
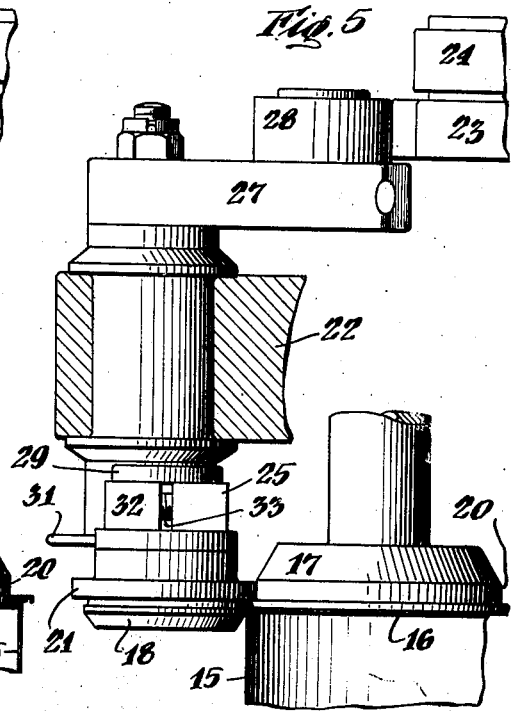
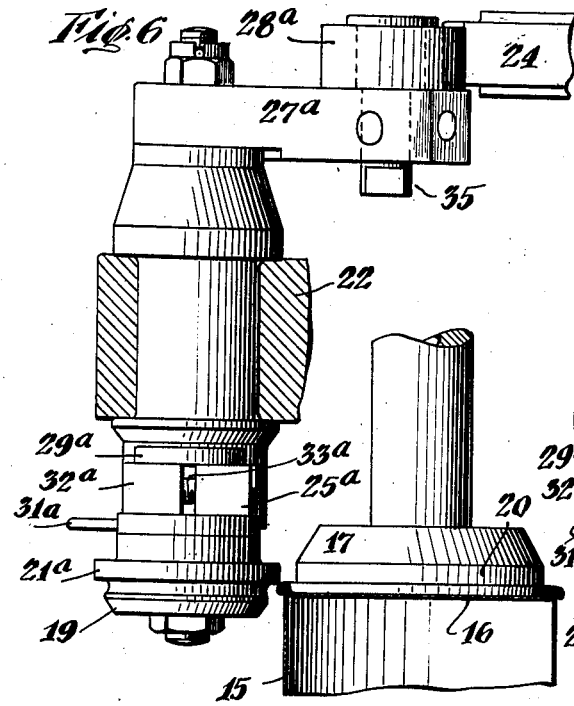
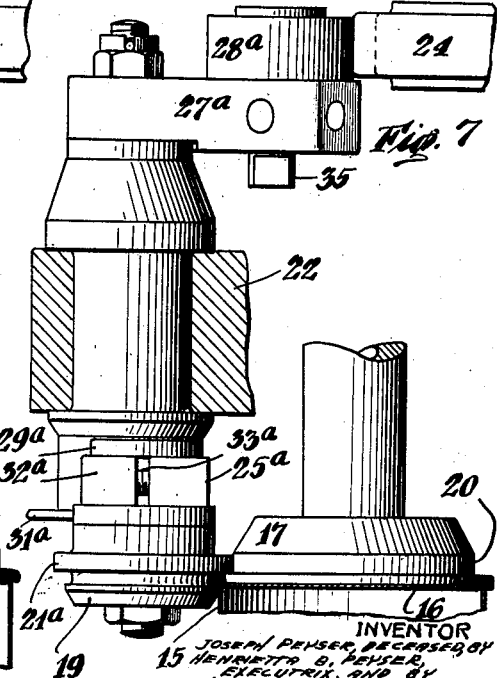

March 19, 1940.  J. PEYSER  2,193,981
SEAMING MACHINE
Filed Sept. 28, 1938   5 Sheets-Sheet 4
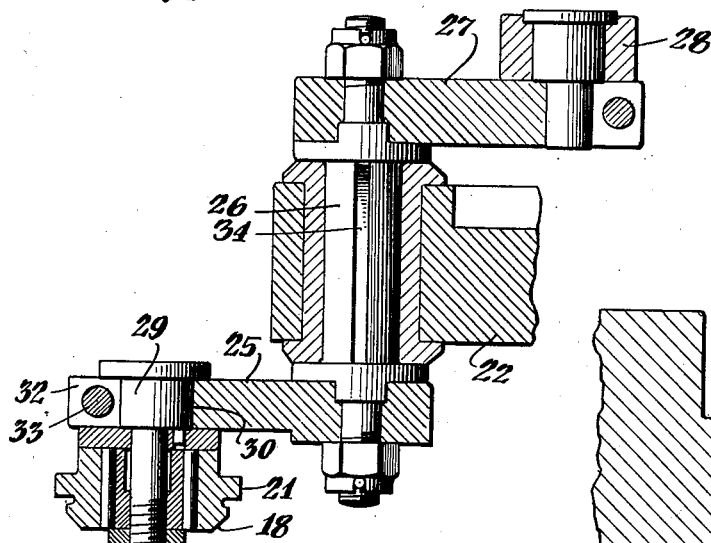
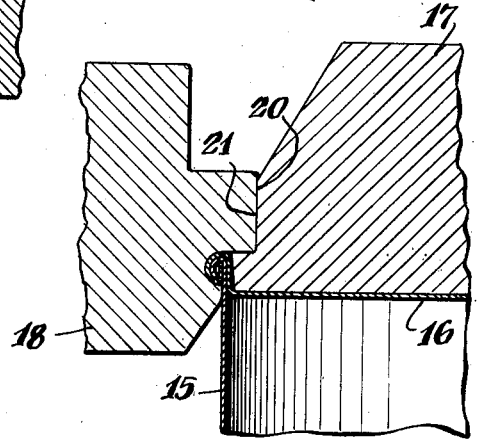
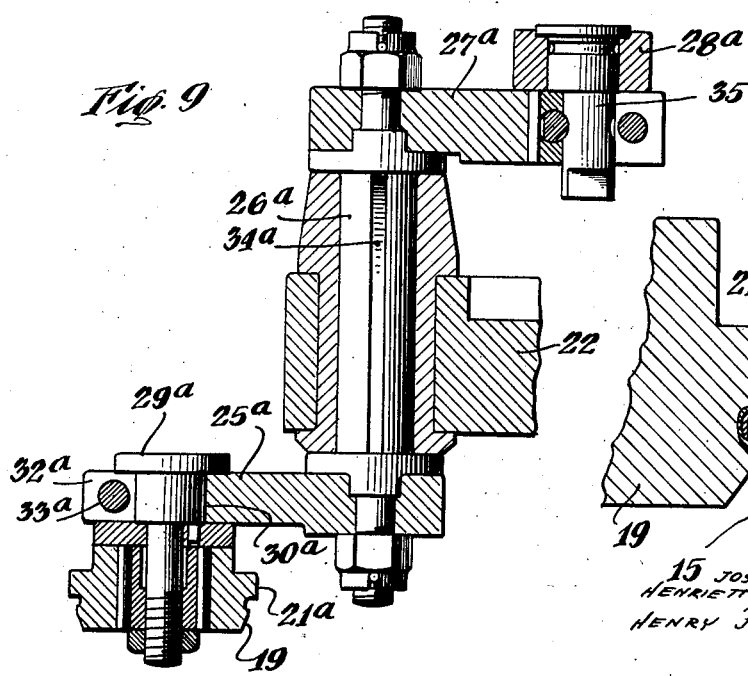
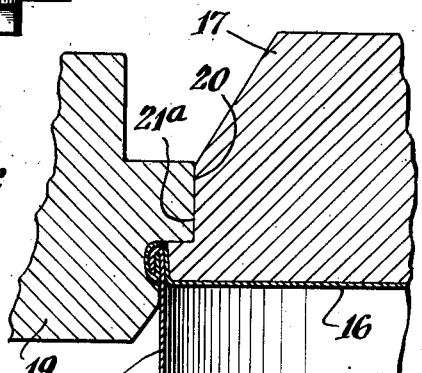
INVENTOR
JOSEPH PEYSER, DECEASED, BY
HENRIETTA S. PEYSER, EXECUTRIX,
AND BY
HENRY J. ENGEL, EXECUTOR,
BY
ATTORNEY Patented Mar. 19, 1940

2,193,981

UNITED STATES PATENT OFFICE 2,193,981

SEAMING MACHINE

Joseph Peyser, deceased, late of Mount Vernon, N. Y., by Henrietta B. Peyser, executrix, Mount Vernon, N. Y., and Henry J. Engel, executor, Mount Vernon, N. Y.

Application September 28, 1938, Serial No. 232,040

5 Claims. (Cl. 113—24)

This invention relates to seaming machines to unite or seam a can-end to a can-body.

In the art as heretofore practiced it has been customary to adjust the seaming-roller on its carrier by rule-of-thumb and then to try by actual seaming of a can-end to a can-body whether or not the seaming-roller occupies the correct seaming position. This operation is usually repeated a number of times before the desired adjustment is obtained and, as there are usually a number of seaming-rollers in a machine, a considerable amount of time is expended in obtaining correct position of the parts.

The main object of this invention is to obviate the necessity for this trial-and-error method by providing means whereby the correct seaming position of the seaming-roller can be accurately and quickly determined without the necessity of resorting to repeated test seaming operations.

The invention consists essentially in providing complementary gaging means that include abutment surfaces on the seaming-roller and chuck which when brought together by adjustment of the seaming-roller on its carrier determine the correct seaming position of the seaming-roller. Other features will appear as the specification proceeds.

In the accompanying drawings the invention is disclosed in a concrete and preferred form in which Fig. 1 is a vertical sectional view substantially on the plane of irregular line 1—1 of Fig. 2;

Fig. 2 is a horizontal sectional view substantially on the plane of line 2—2 of Fig. 1;

Fig. 3 is a horizontal sectional view substantially on the plane of line 3—3 of Fig. 1;

Figs. 4 and 5 are detail sectional views substantially on the plane of line 4—4 of Fig. 3, showing the first-operation seaming-tool in two different positions;

Figs. 6 and 7 are detail sectional views substantially on the plane of line 6—6 of Fig. 3, showing the second-operation seaming-tool in two different positions;

Fig. 8 is a sectional view substantially on the plane of line 8—8 of Fig. 12 showing the first-operation seaming-tool;

Fig. 9 is a sectional view substantially on the plane of line 9—9 of Fig. 12 showing the second-operation seaming-tool;

Fig. 10 is a fragmentary sectional view of the abutment member of the first-operation seaming-tool and the central chuck;

Fig. 11 is a fragmentary sectional view of the abutment member of the second-operation seaming-tool and the central chuck.

Figure 12:
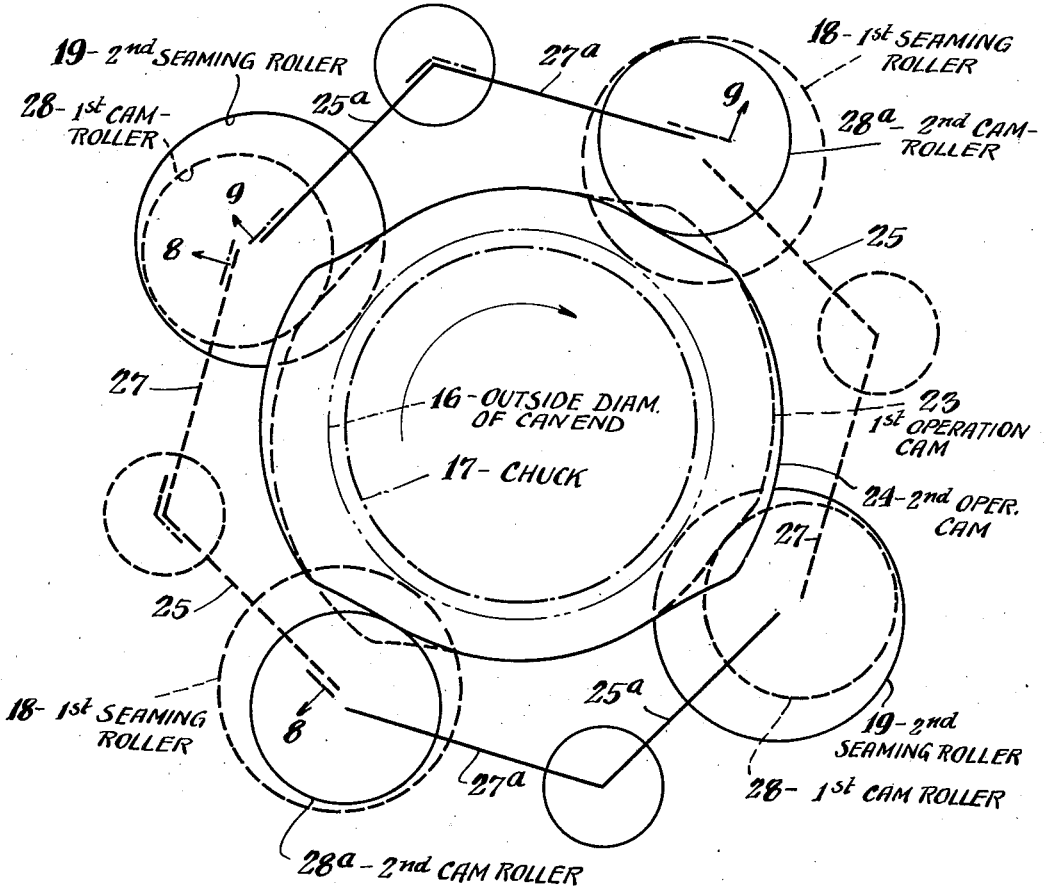
Fig. 12 is a diagrammatic plan view of the seaming-tools and seamer-cams showing both the first and second-operation seaming-tools in their outer position.

Referring to Figs. 10 and 11, reference character 15 indicates a can-body and 16 is the can-end. 17 is the central chuck of the machine that engages the can-end, 18 is the first-operation seaming-roller and 19 the second-operation seaming-roller. The gaging means consist of an abutment surface 20 on chuck 17 and complementary abutment surfaces 21 on the first-operation seaming-roller and 21a on the second-operation seaming-roller. The parts are so arranged that when the complementary abutment surfaces on the chuck and the seaming-rollers are brought together, said seaming-rollers occupy the correct seaming position.

The general principle of the invention now being understood, a more detailed description will be given.

Central chuck 17 engages the can-end and in connection with the usual pedestal (not shown) clamps the work during the seaming-operation. 22 is the seamer-head and, in accordance with usual practice, the seamer-head and the work and chuck are given a relative rotative movement by one of the many expedients well-known in the art. In the present instance, the work and chuck stand still and the seamer-head rotates. 23 and 24 indicate the first-operation and second-operation seamer-cams and, in accordance with well-known practice, there is a difference of one revolution per cycle of the seamer-head and seamer-cams. In the present instance, four seaming-rollers are employed: two first-operation rollers 18 and two second-operation rollers 19 all carried by the seamer-head. As all the seaming-roller mountings are alike, except for differences to be pointed out later, it will only be necessary to describe one of said mountings. Taking as an example first-operation seaming-roller 18, it will be seen that said seaming-roller is mounted on a carrier 25 and that suitable means are provided to impart to this carrier a movement of a given amplitude with respect to the chuck. The actuating means consist of cam 23 and suitable connection. In the present instance a detailed description of the parts is as follows: 26 is a pivot member rotatably seated in the seamer-head and supporting at one end carrier 25 and having at its other end an arm 27 provided with a cam-roll 28 which latter engages seamer-cam 23. It will be apparent that, when cam-roll 28 reaches the high point or surface of seamer-cam 23, seamer-roller 18 will move toward the work and chuck. Centrifugal force acts to throw the seaming-roller outwardly when the high point or surface of the seamer-cam passes the point where cam-roll 28 is located. Suitable means are provided to adjust seamer-roller 18 with respect to carrier 25, such means, in the present instance, taking the form of eccentric 29 which can be turned in its seat 30 on carrier 25, as by means of pin 31. The end of carrier 25 is bifurcated as indicated at 32 and a bolt or screw 33 is provided to cause the bifurcated end of the carrier to clamp the eccentric in its adjusted position.

The method of predetermining the correct position of the seamer-roller with respect to the work to be acted upon is as follows: cam-roll 28 is brought against the high surface of seamer-cam 23 thereby causing seamer-roller 18 to move toward the chuck. Said seamer-roller 18 is now adjusted on carrier 25 by means of eccentric member 29 thereby bringing abutment surface 21 in contact with abutment surface 20 on the chuck, and it will be noted that this adjustment is accomplished without changing the amplitude of the movement imparted by cam 23 to the seaming roller. Preferably the adjustment of eccentric member 29 is continued slightly after abutment surfaces 21 and 20 engage, this action being permitted by the yieldable connection formed by pivot member 26 which is provided with two longitudinal slots or grooves 34. In other words, a slight torsional twist is imparted to pivot member 26. Screw 33 is now tightened to hold eccentric member 29 in its adjusted position. Surfaces 21 and 20 are accurately finished surfaces, and it will now be found that the proper seaming position of seamer-roller 18 has been predetermined and established. It will thus be seen that, during the seaming operation, i. e. while cam 23 is engaging cam-roll 28, circular abutment surface 21 will travel in contact with circular abutment surface 20 and will thus maintain a proper relationship between seamer-roll 18 and the work.

It is unnecessary to repeat the description of the mounting for second-operation seaming-roller 19 except to say that numerals 25 to 34 inclusive with the exponent *a* refer to the corresponding elements of first-operation seaming-roller 18. The only difference in the two seaming-roller assemblies resides in the mounting of cam-roll 28*a* which has an eccentric member 35 whereby the cam-roll can be adjusted into and out of contact with the high point of seamer-cam 24.

In Fig. 12 is a diagrammatic showing of the relationship between the seamer-cams, the cam-rolls, the seaming-rollers, the chuck and the work. The principal object of this diagram is to show that, at one point in the seaming-cycle, both the first and the second-operation seaming-rollers are out of contact with the work so as to allow the latter to be introduced into, and withdrawn from, the plane of the seaming-rollers.

What is claimed is:

1. In a seaming machine having a central chuck to engage a can-end that is to be seamed to a can-body and having a seaming-roller, means to impart to said seaming-roller a movement of a given amplitude toward the work to seam the can-end to the can-body, gaging means, to predetermine the correct seaming position of the seaming-roller, including complementary abutment surfaces on said seaming-roller and chuck and means to adjust the position of the seaming-roller, without changing the amplitude of its movement toward the work to thereby cause the complementary abutment surfaces to engage each other during the seaming operation.

2. In a seaming machine having a central chuck to engage a can-end that is to be seamed to a can-body and having a seaming-roller, means to impart to said seaming-roller a movement of a given amplitude toward the work to seam the can-end to the can-body, gaging means, to predetermine the correct seaming position of the seaming-roller, including complementary abutment surfaces on said seaming-roller and chuck; a carrier for the seaming-roller; actuating means including a yieldable connection to move said carrier with respect to chuck; and means to adjust the seaming-roller on the carrier, without changing the amplitude of its movement toward the work, to thereby flex the yieldable connection and to admit of the complementary abutment surfaces engaging each other during the seaming operation by flexing and placing under tension said yieldable connection under compulsion of the actuating means.

3. In a seaming machine having a central chuck to engage a can-end that is to be seamed to a can-body and having a seaming-roller, means to impart to said seaming-roller a movement of a given amplitude toward the work to seam the can-end to the can-body, gaging means, to predetermine the correct seaming position of the seaming-roller, including complementary abutment surfaces on said seaming-roller and chuck; a pivotally supported carrier for the seaming-roller; a yieldable pivot member for said carrier; means, including a cam, to move said pivot and carrier; and means to adjust the seaming-roller on the carrier, without changing the amplitude of its movement toward the work, to thereby flex the yieldable pivot member and to admit of the complementary abutment surfaces engaging each other during the seaming operation by flexing and placing under tension said yieldable pivot member under compulsion of the cam.

4. In a seaming machine having a central chuck to engage a can-end that is to be seamed to a can-body and having a seaming-roller, means to impart to said seaming-roller a movement of a given amplitude toward the work to seam the can-end to the can-body, gaging means, to predetermine the correct seaming position of the seaming-roller, including complementary abutment surfaces on said seaming-roller and chuck; a carrier for the seaming-roller; actuating means, including a cam and a cam-roll, to move said carrier with respect to the chuck; and means to adjust the seaming-roller on the carrier, without changing the amplitude of its movement toward the work, while the cam roll is in engagement with the high point of the cam to thereby bring the abutment surfaces into engagement.

5. In a seaming machine having a central chuck to engage a can-end that is to be seamed to a can-body and having a seaming-roller, means to impart to said seaming-roller a movement of a given amplitude toward the work to seam the can-end to the can-body, gaging means, to predetermine the correct seaming position of the seaming-roller, including complementary circular abutment surfaces on said seaming-roller and chuck and means to adjust the position of the seaming-roller, without changing the amplitude of its movement toward the work to thereby cause the complementary abutment surfaces to engage each other during the seaming operation.

HENRIETTA B. PEYSER,
*Executrix of the Last Will and Testament of Joseph Peyser, Deceased.*

H. J. ENGEL,
*Executor of the Last Will and Testament of Joseph Peyser, Deceased.*